United States Patent

Showalter et al.

Patent Number: 5,520,590
Date of Patent: May 28, 1996

[54] TRANSFER CASE FOR FOUR WHEEL DRIVE VEHICLES

[75] Inventors: Dan J. Showalter, Plymouth; Mark A. Lindsey, Southfield; Ray F. Hamilton; Ronald A. Schoenbach, both of Farmington Hills, all of Mich.

[73] Assignee: Borg-Warner Automotive, Inc., Sterling Heights, Mich.

[21] Appl. No.: 420,965

[22] Filed: Apr. 13, 1995

Related U.S. Application Data

[62] Division of Ser. No. 100,560, Jul. 30, 1993, Pat. No. 5,409,429.

[51] Int. Cl.⁶ ............................................ F16H 3/44
[52] U.S. Cl. ........................................ 475/295; 180/247
[58] Field of Search .......................... 475/295, 302, 475/303, 332; 180/247

[56] References Cited

U.S. PATENT DOCUMENTS

| | | | |
|---|---|---|---|
| 4,967,616 | 11/1990 | Minami et al. | 108/247 |
| 5,046,998 | 9/1991 | Frost | 180/247 |
| 5,056,634 | 10/1991 | Shiba et al. | 180/247 |
| 5,085,304 | 2/1992 | Barroso | 180/247 |
| 5,117,937 | 6/1992 | Namioka | 180/247 |

*Primary Examiner*—Dirk Wright
*Attorney, Agent, or Firm*—Willian Brinks Hofer Gilson & Lione; Greg Dziegielewski

[57] ABSTRACT

A transfer case for a part-time four wheel drive vehicle includes a planetary gear speed reduction assembly driven by the transfer case input shaft for providing high and low speed range outputs. The planetary gear assembly is disposed between and is selectively engaged by primary and secondary clutch collars, the primary clutch driving the rear (primary) output shaft in either the high or low speed ranges. The secondary clutch drives the front (secondary) output shaft through a chain drive in the low range. The clutch collars are controlled by a single (common) clutch operator. An electromagnetic clutch assembly driven by the input shaft selectively drives the front output shaft chain drive. The electromagnetic clutch functions both as a synchronizer and torque delivery device. The transfer case may be combined with a control which facilitates direct selection of vehicle drive mode.

20 Claims, 3 Drawing Sheets

TRANSFER CASE FOR FOUR WHEEL DRIVE VEHICLES

This is a division of application Ser. No. 08/100,560, filed Jul. 30, 1993, now U.S. Pat. No. 5,409,429.

BACKGROUND OF THE INVENTION

The invention relates generally to a transfer case for incorporation into a four wheel drive vehicle and more specifically to a transfer case having a planetary gear speed reduction assembly for providing high and low speed range outputs and a plurality of clutches for selectively engaging the direct and reduced speed output of the planetary gear assembly to a pair of output shafts. The transfer case may be controlled by a direct or target shift control.

The advantages of four wheel drive in light trucks, sport utility vehicles, off road vehicles and passenger cars are generally acknowledged. Improved vehicle stability and control extends the vehicle safety envelope when road conditions are wet, snowy or icy, for example, and extends the terrain capabilities in off road applications.

Every signpost does not point toward four wheel drive, however. Because of their complexity and increased frictional losses, fuel economy of a vehicle operating in four wheel drive will generally be lower than that of the same vehicle operating in two wheel drive or of a comparable two wheel drive vehicle.

Such increased fuel consumption is also the result of additional weight of four wheel drive systems. The weight increase may be significant if the system is intended for full time operation due to the necessary greater durability of the components whereas the weight penalty may be somewhat less if the four wheel drive components are intended only for limited, part-time use.

While most proponents of four wheel drive acknowledge that the need for and benefits of four wheel drive systems are infrequent and thus that four wheel drive systems which primarily utilize two driving wheels and which may be shifted into four wheel drive by the vehicle operator or by a control system satisfies most four wheel drive demands, such proponents will then also acknowledge that the design of such intermittent four wheel drive systems focuses attention on the mechanical components which effect the shift from two wheel drive to four wheel drive and, if it is an automatically engaging system, its control system.

Part-time four wheel drive trains and vehicles exhibit diverse operational features. For example, whereas certain drive systems and vehicles may be shifted from two wheel drive to four wheel drive at speed, that is, on-the-fly, other must be at a full stop before such shifts are achieved. Likewise, certain vehicle drive train configurations permit simple disconnection of the four wheel drive system and return to two wheel drive system at highway speeds whereas other drive trains require that the vehicle must be stopped or stopped and backed up several feet to properly disengage the system. Obviously, on-the-fly transition between two and four wheel drive is a highly desirable feature.

The operational distinctions between systems can be equally great with regard to the shift between low and high gears of the transfer case. Again, certain designs require that the vehicle be stopped, that it be travelling below a certain speed or be subject to other operational constraints. A design which allows the freedom of all reasonable low to high shifts not only provides increased user flexibility but improved durability and serviceability as well, inasmuch as actions which might constitute operator error and thus damage one vehicle drive system in one configuration are accepted as a normal, safe and appropriate command by another, more flexible system.

Another consideration of manually (driver) selected part-time four wheel drive systems is the driver/vehicle control interface. Three driving modes are offered by the typical system: two wheel drive (high gear); four wheel drive, high gear and four wheel drive, low gear. Conventionally, two momentary switches provide control pulses to a controller module which commands appropriate sequencing and action of, for example, the locking hubs and the transfer case gear range selection and clutch components. A first switch is designated four wheel drive, high gear and shifts the transfer case and vehicle into this driving mode. A second switch selects four wheel drive, low gear. The controller may also inhibit shifts in response to various vehicle conditions such as excessive speed.

Two wheel drive mode is the initial or default condition. To engage four wheel drive, high gear, the four wheel drive switch is depressed momentarily. To return to two wheel drive, the four wheel drive, high gear switch is again momentarily depressed. To achieve four wheel drive, low gear, the four wheel drive low gear switch is depressed once. To return to two wheel drive from four wheel drive low gear, the four wheel drive low gear switch must first be momentarily depressed which shifts the drive system to four wheel drive high gear. Then the four wheel drive high gear switch must be momentarily depressed which returns the drive system to two wheel drive. It is apparent that a simpler, more streamlined shift into and out of four wheel drive, low range is desirable.

The configuration and interaction of the mechanical and electronic components which contemporary four wheel drive systems include is the focus of much development effort. Much development effort generally is directed to what may be characterized as transition states, that is, the components, features and operation of the vehicle drive system as it shifts between two wheel and four wheel drive and back and also shifts between high and low gear ranges if the vehicle is so equipped.

A review of four wheel drive line and transfer case prior art technology reveals diverse approaches which provide commensurately distinct operational features. Said review also reveals that improvements in such drive systems and components are both desirable and possible.

SUMMARY OF THE INVENTION

A transfer case for a part-time four wheel drive vehicle includes a planetary gear speed reduction assembly driven by the transfer case input shaft for providing high and low speed range outputs. The planetary gear assembly is disposed between and is selectively engaged by primary and secondary sliding clutch collars, the primary clutch driving the rear (primary) output shaft in either the high or low speed ranges. On-the-fly upshifts of the primary drive line from low to high gear are readily accomplished. The secondary clutch drives the front (secondary) output shaft through a chain drive in the low range. The clutch collars are controlled by a single (common) clutch operator. An electromagnetic clutch assembly driven by the input shaft selectively drives the front output shaft chain drive in the high speed range. The electromagnetic clutch functions both as a synchronizer and a torque delivery device which may be modulated to proportion torque delivery between the primary and secondary drive lines. While generally described herein with reference to a primary rear wheel drive vehicle, the transfer case functions equally well with primary front wheel drive vehicles.

The transfer case may be combined with a direct or target shift control having three positions and operational modes: two wheel drive (high gear); four wheel drive, high gear and four wheel drive, low gear. Driver selection of one of the three operational modes with the shift control of the present invention is direct and unambiguous.

Thus it is an object of the present invention to provide a transfer case having an electromagnetic clutch which may be utilized to bring the front drive shaft and associated components up to speed, to deliver torque to the front wheels and to provide a synchronized shift from low to high gear.

It is a further object of the present invention to provide a transfer case having a planetary gear set for speed reduction and torque multiplication.

It is a further object of the present invention to provide a transfer case having a primary sliding clutch collar for providing high, neutral and low speed range outputs to the rear (primary) vehicle drive shaft.

It is a still further object of the present invention to provide a transfer case having a secondary, spring loaded sliding clutch collar which provides direct torque delivery from the low speed planetary output to the front (secondary) drive line.

It is a still further object of the present invention to provide a transfer case wherein on-the-fly shifts from low to high gear may be accomplished in both the primary and secondary drive lines.

It is a still further object of the present invention to provide a transfer case wherein the foregoing components are arranged about the input and output shafts of a transfer case such that the foregoing operational features may be achieved.

It is a still further object of the present invention to provide a transfer case shift control which directly and unambiguously selects the vehicle transfer case drive mode.

Further objects and advantages of the present invention will become apparent by reference to the following description and preferred embodiment and the appended drawings.

BRIEF DESCRIPTION OF THE DRAWINGS

FIG. 3 is a fragmentary, half sectional view of a transfer case according to the present invention wherein the clutches are configured for operation in the high gear range output of the planetary gear set;

FIG. 4 is a flat pattern development of a section of one clutch ball and associated recesses incorporated in the electromagnetic clutch assembly according to the present invention taken along line 4—4 of FIG. 3;

DESCRIPTION OF THE PREFERRED EMBODIMENT

Figure 1:
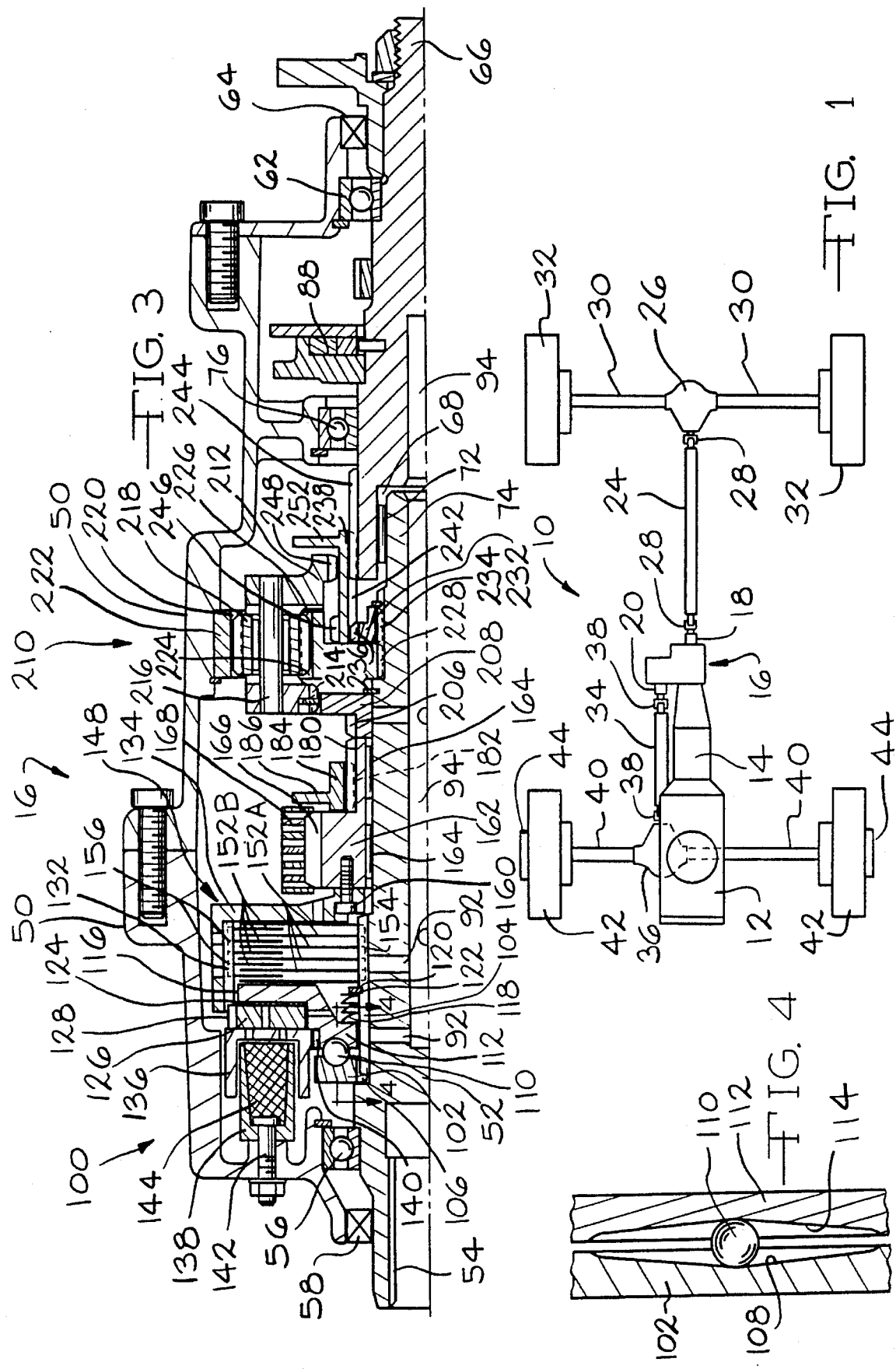
FIG. 1 a schematic plan view of a four wheel vehicle drive system incorporating a transfer case according to the present invention.
Figure 5:
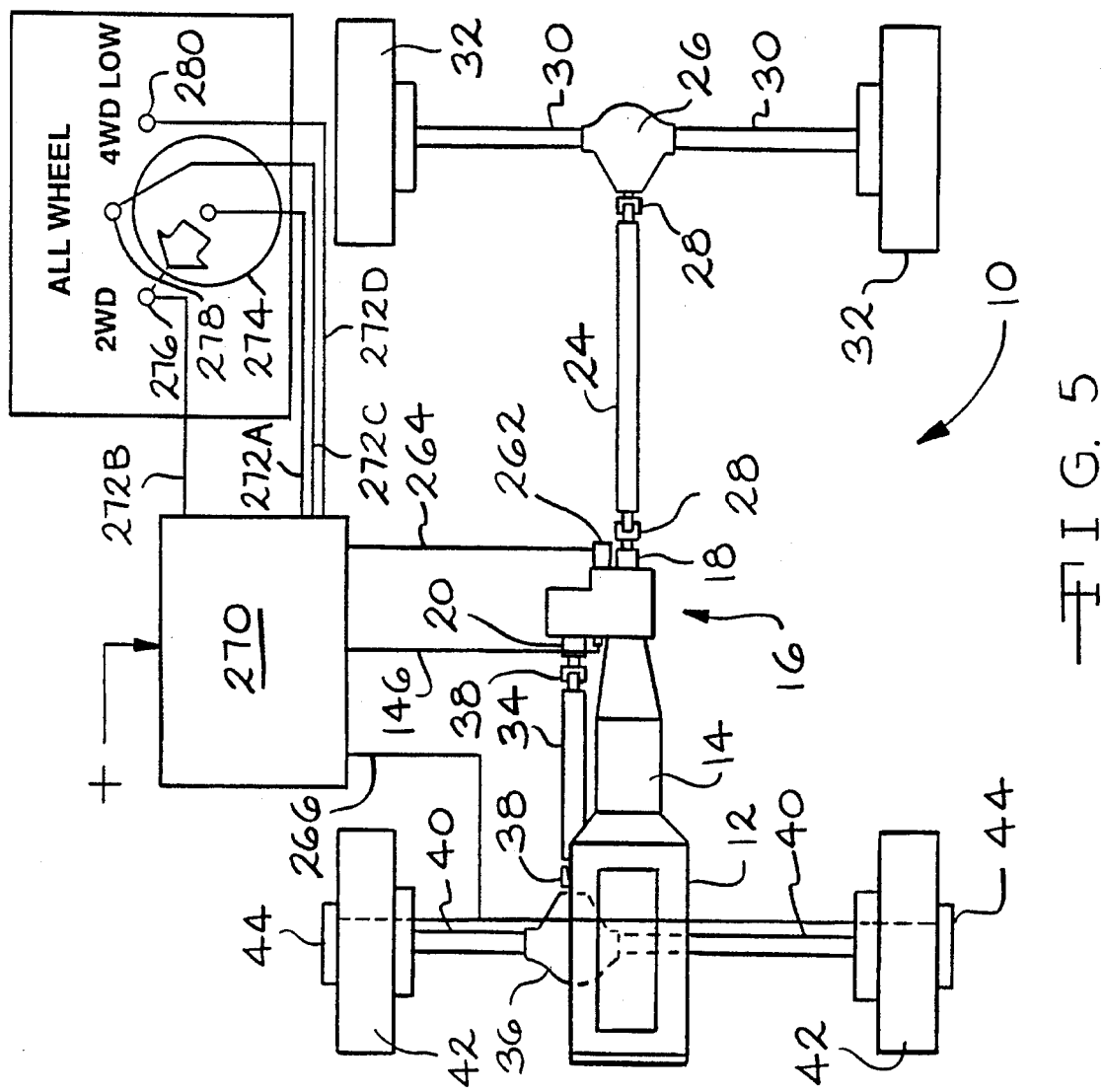
FIG. 5 is a diagrammatic plan view of a four wheel vehicle drive system incorporating the transfer case and target shift control according to the present invention.

Referring now to FIG. 1, a vehicle drive system incorporating the present invention is illustrated and generally designated by the reference numeral 10. The vehicle drive system 10 includes a prime mover such as an internal combustion engine 12 having an output which is operably coupled to a transmission 14. The transmission 14 has an output which, in turn, is operably coupled to a transfer case assembly 16 according to the instant invention. The transfer case assembly 16 includes a primary, rear output shaft 18 and a secondary, front output shaft 20. The rear output shaft 18 of the transfer case 16 drives a rear drive shaft 24 which delivers power to a rear differential 26. Universal joints 28 are utilized as necessary and in accordance with conventional practice to couple the rear output shaft 18 to the rear differential 26. The output of the rear differential 26 is coupled through rear drive axles 30 to a pair of rear tire and wheel assemblies 32. Similarly, the front or secondary output shaft 20 of the transfer case 16 drives a front drive shaft 34 which delivers power to a front differential 36. Again, appropriate universal joints 38 are utilized as necessary in accordance with conventional practice to couple the front output shaft 20 to the front differential 36. The front differential 36 delivers through a pair of front axles 40 to a pair of front tire and wheel assemblies 42 through a respective pair of locking hubs 44. The locking hubs 44 may be either manually or automatically activated. If the locking hubs 44 are utilized with a system such as illustrated in FIG. 5 or other automatic or semi-automatic system, they are preferably remotely activated by electric, pneumatic or hydraulic means.

The rear output shaft 18, the rear drive shaft 24, the rear differential 26, the universal joints 28, the axles 30 and the rear tire and wheel assemblies 32 constitute the rear or primary drive line in the configuration illustrated whereas the output shaft 20, the front drive shaft 34, the front differential 36, the universal joints 38, the front drive shafts 40, the front tire and wheel assemblies 42 and the front locking hubs 44 constitute the front or secondary drive line.

While the layout shown and described is considered to be a more typical application of the transfer case assembly 16 according to the present invention, it is anticipated and deemed to be well within the scope of the present invention for the transfer case assembly 16 to be utilized with a vehicle having its primary (full-time) drive wheels located at the front of the vehicle and the secondary (part-time) drive wheels located at the rear.

Figure 2:
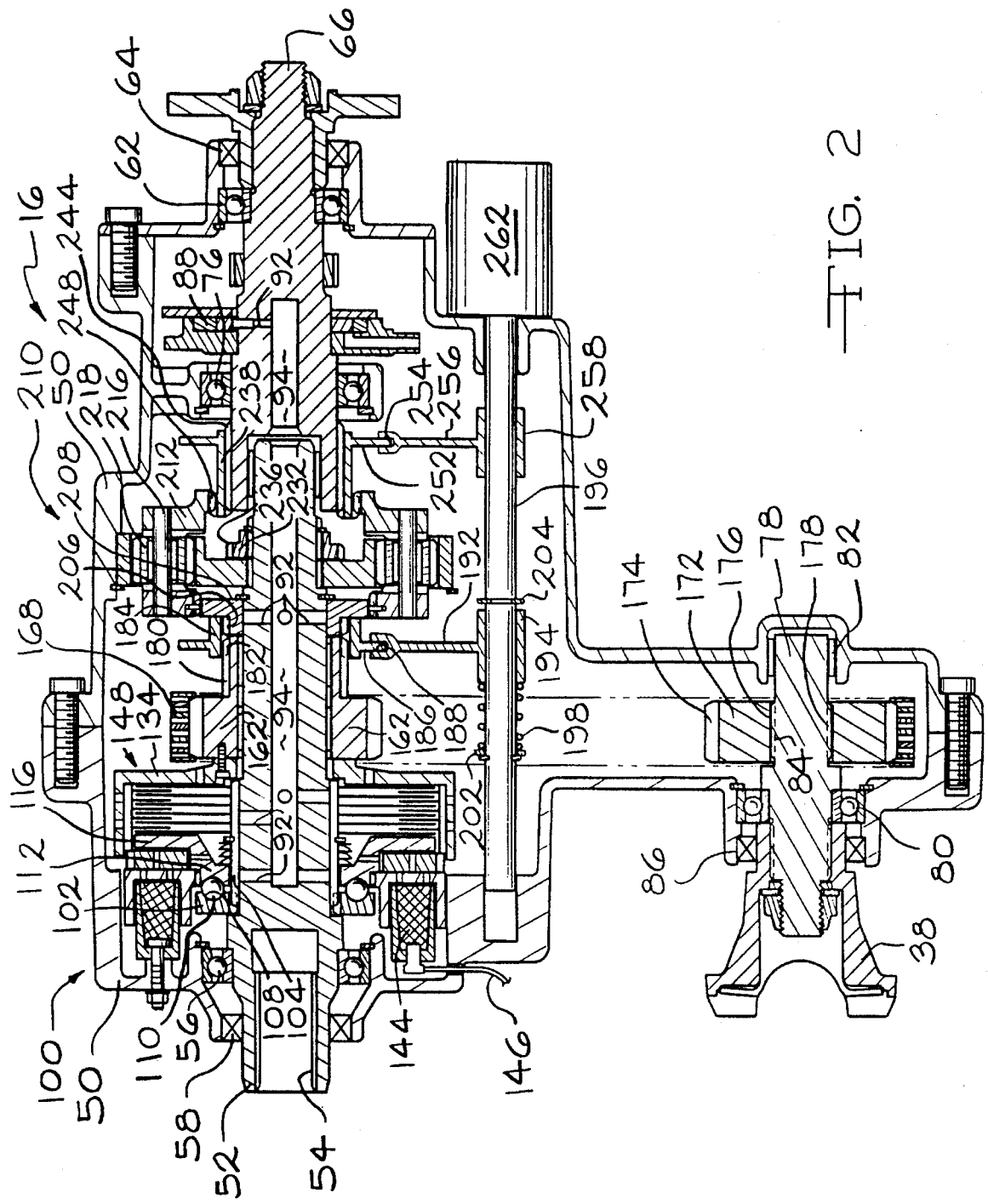
FIG. 2 is a full, sectional view of a transfer case according to the present invention with the clutches positioned for four wheel drive in the low speed range.

Referring now to FIGS. 2 and 3, the transfer case assembly 16 includes a multiple part, typically cast, housing 50 having various openings for shafts and fasteners and various mounting surfaces and grooves for oil seals, bearings, seal retaining rings and other internal components as will be readily appreciated. The housing 50 receives an input shaft 52 having a splined interconnection 54 or other suitable structure for achieving driving coupling to the output of the transmission 14 illustrated in FIG. 1. The input shaft 52 is partially supported upon an anti-friction bearing such as the ball bearing assembly 56. An oil seal 58 surrounds the input shaft 52 at the forward end of the housing 50. At the opposite end of the housing 50, a similar arrangement including a ball bearing assembly 62 rotatably supports a primary or first output shaft 66 and an oil seal 64 provides an appropriate seal. The primary output shaft 66 defines a bore 68 at one end which receives a roller bearing 72. The roller bearing 72 in turn receives and rotatably supports a reduced diameter region 74 of the input shaft 52. A anti-friction bearing such as the ball bearing assembly 76 supports the primary output shaft 66 between the roller bearing assembly 72 and the ball bearing assembly 62.

The housing 50 of the transfer case assembly 16 also receives a secondary or second output shaft 78 which is supported by a pair of anti-friction bearings such as a ball bearing assembly 80 and a roller bearing assembly 82. The secondary output shaft 78 includes male splines 84. An oil seal 86 is positioned between the transfer case housing 50 and a portion of the universal joint 38.

Disposed on the output shaft 66 between the ball bearing assemblies 62 and 76 is a gerotor pump 88. The gerotor pump 88 functions in conventional fashion to draw lubricating fluid from a sump (not illustrated) and provide it to the various components of the transfer case assembly 16 through cooperating radial passageways 92 and an axial passageway 94 extending along a portion of the primary output shaft 66 and a substantial portion of the input shaft 52.

Within the end of the transfer case 16 proximate the transmission 14, that is, the end containing the input shaft 52, is an electromagnetically actuated disc pack type clutch assembly 100. The clutch assembly 100 is disposed about the input shaft 52 and includes a circular drive member 102 coupled to the input shaft 52 through a spline 104 on the input shaft 52 and complementary splines 106 on the circular drive member 102. One face of the circular drive member 102 includes a plurality of circumferentially spaced apart recesses 108 in the shape of an oblique section of a helical torus, as illustrated in FIG. 4. Each of the plurality of recesses 108 receives one of a like plurality of load transferring balls 110.

A circular driven member 112 disposed adjacent the circular drive member 102 includes a like plurality of recesses 114, on an opposing face, defining the same shape as the recesses 108. The oblique sidewalls of the recesses 108 and 114 function as ramps or cams and cooperate with the balls 110 to drive the circular members 102 and 112 apart in response to relative rotation therebetween. It will be appreciated that the recesses 108 and 114 and the load transferring balls 110 may be replaced with other analogous mechanical elements which cause axial displacement of the circular members 102 and 112 in response to relative rotation therebetween. For example, tapered rollers disposed in complementarily configured conical helices may be utilized.

The circular driven member 112 is disposed for rotation about the input shaft 52 and includes a radially outwardly extending apply plate 116. A compression spring 118 is concentrically disposed about the input shaft 52 and is restrained by a snap ring 120 which is received within a complementary groove 122 formed in the splines 104 of the input shaft 52. The compression spring 118 may include a plurality of Belleville springs or wave washers. The compression spring 118 provides a biasing or restoring force to the circular driven member 112 and the apply plate 116, driving them to the left as illustrated in FIGS. 2 and 3.

To the left of the apply plate 116 and generally aligned therewith is a circular flat washer 124. Adjacent the flat washer 124 is a clutch armature 126. The clutch armature 126 includes gear teeth or splines 128 disposed about its periphery which engage a complementary set of splines or teeth 132 extending axially along the inner, cylindrical surface of an annular clutch housing 134. Positioned adjacent the face of the armature 126 opposite the flat washer 124 and the apply plate 116 is a circular coil housing 136.

The coil housing 136 is freely, rotatably received upon a complementarily configured stationary mounting ring 138. The coil housing 136 is coupled to and rotates with the circular driven member 112 by virtue of a splined interconnection 140. The mounting ring 138 is secured to the housing 50 of the transfer case 10 by a plurality of suitable fasteners 142, one of which is illustrated in FIGS. 2 and 3. The mounting ring 138 receives an electromagnetic coil 144 which is connected to a source of electrical energy through a conductor 146.

Adjacent the apply plate 116 and contained within the annular housing 134 is a disc pack assembly 148. The disc pack assembly 148 includes a plurality of interleaved friction plates or discs 152. A first plurality of larger discs 152A are coupled to the input shaft 52 for rotation therewith by interior splines 154 which engage the splines 104 on the input shaft 52. A second plurality of smaller discs 152B are interleaved with the first plurality of discs 152A and include splines 156 on their peripheries which engage the splines or teeth 132 on the inner surface of the annular housing 134 and rotate therewith.

When electrical energy of sufficient magnitude is provided to the electromagnetic coil 144 of the disc pack type clutch assembly 100, the resulting magnetic field causes the circular armature 126 to be attracted to the coil housing 136. This magnetic attraction results in frictional contact of the armature 126 with the coil housing 136. This frictional contact and the resulting drag causes the balls 110 to ride up the ramped surfaces of the recesses 108 and 114 thereby causing axial displacement of the circular driven member 112 and the apply plate 116. Depending upon the magnitude of the electric current to the coil 144 and thus the magnetic field, the magnetic attraction and the resulting frictional drag, the magnitude of the torque transferred from the input shaft 52 through the disc pack assembly 148 to the annular housing 134 may be controlled and adjusted.

The compression spring 118 provides a restoring force which biases the circular driven member 112 toward the circular drive member 102 and returns the load transferring balls 110 to center positions in the recesses 106 and 114 to provide maximum clearance and minimum friction between the components of the electromagnetic clutch assembly 100 when it is deactivated. An important design consideration of the recesses 108 and 114 and the balls 110 is that their design geometry and the design of the compression spring 118, as well as the clearances of the clutch assembly 100, ensure that the clutch assembly 100 is not self-locking. The electromagnetic clutch assembly 100 must not self-engage but rather must engage proportionally only in response to electrical energy supplied to the coil 144.

The annular housing 134 is coupled by any suitable means such as a plurality of threaded fasteners 160 to a chain drive sprocket 162 which is freely rotatably disposed about the input shaft 52 on a plurality of anti-friction bearings such as roller bearing assemblies 164. The drive sprocket 162 includes a plurality of teeth 166 adapted to engage and drive a chain 168. The chain 168 engages a driven sprocket 172 having teeth 174 about its periphery and splines 176 on an interior aperture 178 which engage complementarily configured splines 84 disposed on the secondary output shaft 78.

The drive sprocket 162 also includes a plurality of male splines or gear teeth 180. The gear teeth 180 are in constant mesh with complementarily configured splines or teeth 182 disposed on the interior of a secondary dog clutch 184. The secondary dog clutch 184 also includes a radially extending circular plate or disc 186, a portion of which is freely, rotatably received within a complementarily configured forks 188 of a secondary shift fork assembly 192. The secondary shift fork assembly 192 also includes a journal bearing collar 194 which slidably receives a shift control rod 196 supported for axial translation in the housing 50. Adjacent the end of the journal collar 194 more proximate the drive chain 168 and positioned about the shift control rod 196 is a compression spring 198. A spring stop 202 which may be a pin extending radially through the shift control rod 196 and a washer or a snap ring secured thereto engages one end of the compression spring 198 whereas the other end abuts the journal collar 194. A similar limit stop 204 which again may either be a radially disposed pin extending through the shift control rod 196 or a snap ring is disposed generally adjacent the opposite end of the journal collar 194 and limits translation of the secondary shift fork assembly 192 along the shift control rod 196 in response to bias provided by the compression spring 198. Cooperation of the spring stop 202 and the limit stop 204 with the journal collar 194 of the secondary shift fork assembly 192 and the compression spring 198 provides a resilient coupling between the shift control rod 196 and the shift fork assembly 192 when the shift control rod 196 translates to the right as illustrated in FIGS. 2 and 3. The compression spring 198 may also be utilized to provide a pre-load force urging the secondary shift fork assembly 192 against the limit stop 204, if desired.

When the secondary dog clutch 184 is moved to the right as illustrated in FIGS. 2 and 3, the teeth 182 engage complementarily configured gear or spline teeth 206 on a secondary drive collar 208.

The secondary drive collar 208 functions as one output member of a planetary gear speed reduction assembly 210. The planetary gear speed reduction assembly 210 includes a carrier 212 which is rotationally coupled to the drive collar 208 through a splined interconnection 214. The carrier 212 receives a plurality of uniformly arranged, fixed stub shafts 216. The plurality of stub shafts 216, one of which is illustrated in FIG. 3, receive a respective one of a like plurality of planet gears 218. The planet gears 218 are in constant mesh with the gear teeth 220 of a stationary ring gear 222 which is received within and secured to the housing 50 of the transfer case assembly 16.

Also in constant mesh with the planet gears 218 is a centrally disposed sun gear 224. The sun gear 224 includes peripheral gear teeth 226. The sun gear 224 is coupled to the input shaft 52 for rotation therewith through a splined interconnection 228. A primary drive collar 232 is also coupled to the input shaft 52 by a splined interconnection 234 and resides immediately adjacent the face of the sun gear 228 opposite the secondary drive collar 208. The primary drive collar 232 includes a plurality of gear teeth or splines 236 disposed about its periphery. If desired, the primary drive collar 232 may be secured to or formed as an integral component of the sun gear 224.

A primary dog clutch 238 includes internal gear teeth or splines 242 which are complementarily to the gear teeth or splines 236 on the periphery of the primary drive collar 232. The primary dog clutch 238 is slidably received upon axially extending gear teeth or splines 244 on the adjacent terminal portion of the output shaft 66. On the outer surface of the dog clutch 238, disposed generally adjacent the sun gear 224, are male gear teeth or splines 246. The male splines 246 may be selectively engaged with complementarily configured gear teeth or female splines 248 on the carrier 212. The primary dog clutch 238 also includes a radially extending circular plate or disc 252 which is received within complementarily configured forks 254 of a primary shift fork assembly 256. The primary shift fork assembly 256 also includes a collar 258 which is fixedly secured to the shift control rod 196.

A shift control operator 262 which may be either an electric, hydraulic or pneumatic device receives control energy in a line 264. The shift control operator 262 translates the shift control rod 196 and thus the dog clutches 184 and 238 between three distinct positions which may be generally characterized as high gear, to the left as illustrated in FIGS. 2 and 3, low gear, to the right as illustrated in FIGS. 2 and 3 and neutral, a position midway between the left and right positions wherein the secondary dog clutch 184 does not engage the secondary drive collar 208 and the primary dog clutch 238 does not engage either the primary drive collar 232 or the carrier 212.

Referring now to FIG. 5, the vehicle drive system 10 also illustrated in FIG. 1 is represented and includes all the same features and components, particularly the transfer case 16 according to the present invention and the locking hubs 44 which are disposed at the front of the vehicle, in the secondary drive line. As noted previously, the invention disclosed and claimed herein is equally suitable for use with a primary front wheel, secondary rear wheel drive system.

The locking hubs 44, as previously noted, may be either pneumatically, electrically or hydraulically operated. A line 266 provides an appropriate control signal or energy to the locking hubs 44. The line 266 as well as the conductor 146 and the line 264 all communicate with a controller 270. The controller 270 may be one of a number of microprocessor based controllers utilized to monitor and control the operation of part-time four wheel drive vehicle systems. The controller 270 will typically receive other signals including, for example, the selected gear of the vehicle transmission 14, the speed of the vehicle, the speed of the engine 12 and the like. The controller 270 also receives signals in lines 272 from a direct or target shifting control switch 274. Preferably the control switch 274 is a three position rotary switch. A line 272A is coupled to a center or common terminal on the control switch 274 and a wiper on the switch 274 contacts a terminal 276 to provide a signal to the controller 270 through a line 272B that the two wheel drive (high gear) mode has been selected by the driver. Similarly, the switch 274 may be rotated to a center position wherein the line 272A is coupled to the terminal 278 and thence back to the controller through a line 272C. In this position, the driver has selected all wheel drive, i.e., four wheel drive, high gear. Finally, the switch 274 may be rotated such that the line 272A is coupled to the terminal 280 and thence through the line 272D back to the controller 270. In this position, the driver has selected four wheel drive, low range. It will be appreciated that one of the lines 272B, 272C or 272D may be omitted if, for example, the controller 270 defaults to a given drive mode when it does not receive a return signal on the two remaining lines.

In each position, the controller 270 provides appropriate signals through the conductor 146 and the lines 264 and 266 to select the proper action of the electromagnetic clutch assembly 100, the shift control operator 262 and the locking hubs 44, respectively. With the three position rotary control switch 274, it will be appreciated that the driver of the vehicle may directly and unambiguously select one of the three drive modes of the four wheel vehicle drive system 10.

Figure 6:
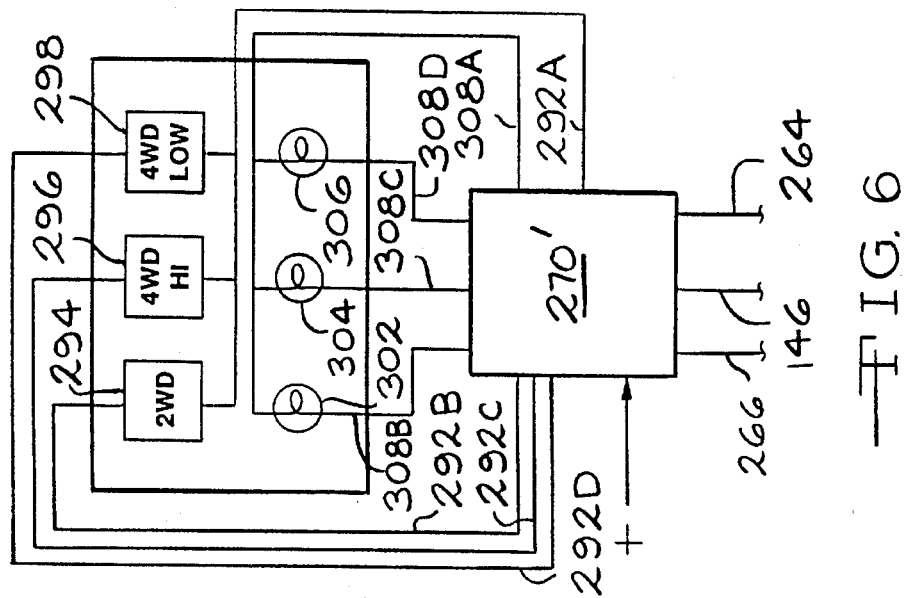
FIG. 6 is a fragmentary, diagrammatic view of an alternate embodiment of a target shift control according to the present invention.

Referring now to FIG. 6, a first alternate embodiment of the direct or target shift control configuration of FIG. 5 is illustrated. The system illustrated in FIG. 6 includes a controller 270' which is similar to the controller 270 illustrated in FIG. 5 and thus provides control signals or energy through the conductor 146 and the lines 264 and 266 to the associated components of the vehicle drive system 10. The controller 270' may also accept signals relating to the speed of the engine, the speed of the vehicle and the selected gear, as noted above, from sensors in the vehicle. The controller 270' is different, however, in that it accepts pulses or pulsed signals from momentary contact switches and also provides electrical signals to indicators which provide information to the vehicle driver about the currently selected vehicle drive mode.

Specifically, a line 292A from the controller 270' provides electrical power or a logic signal to a plurality of push-button switches. A first push-button switch 294 may be momentarily depressed to select two wheel drive (high gear). A line 292B provides the momentary signal or pulse to the controller 270. A second push-button switch 296 may be momentarily depressed to engage four wheel drive, high range and the line 292C provides a signal or pulse to the controller 270'. A third push-button switch 298 may be momentarily depressed by the driver to select four wheel drive, low range. Likewise, a line 292D carries the signal or pulse to the controller 270'. It may be appreciated that the vehicle operator may directly select and depress one of the push-buttons 294, 296 or 298 to directly and unambiguously select the desired vehicle drive mode. A first indicator lamp or LED 302 is coupled to the controller 270' through the lines 308A and 308B and illuminates; when the two wheel drive mode has been selected. Similarly, a second indicator lamp or LED 304 is provided with electrical energy through a line 308C and illuminates when four wheel drive, high range has been selected. Finally, a third indicator lamp or LED 306 is provided with electrical energy through a line 308D and illuminates when four wheel drive, low range has been selected. The lamps or LED'S 302, 304 and 306 may be arranged integrally with the push-buttons 294, 296 and 298, respectively, to illuminate them and may also present distinct colors such as green, yellow and red to further differentiate and annunciate the selected vehicle drive mode.

A significant feature of the transfer case 16 is the arrangement or interrelationship of components along the axial length of the input shaft 52 and the output shaft 66. That is, the chain drive sprocket 162 which provides drive torque to the front tire and wheel assemblies 42 through the second output shaft 78 is disposed between, i.e., juxtaposed, both the disc pack type clutch assembly 100 and the secondary dog clutch 184. The chain drive sprocket 162 is, as noted, secured to the annular clutch housing 134 of the disc pack type clutch assembly 100. Thus, modulating or direct high speed range torque is provided to the chain drive sprocket 162 from one side. The secondary dog clutch 184, may selectively engage the cooperating gear teeth or splines 206 on the secondary drive collar 208, thereby positively engaging it to the carrier 212 of the planetary gear speed reducing assembly 210. Accordingly, low speed range torque is supplied to the chain drive sprocket 162 from the other side.

There are thus two torque paths between the input shaft 52 and the chain drive sprocket 162. The first torque path is through the disc pack type clutch assembly 100 and the torque slapplied may be scaled or modulated to, for example, selectively bring the chain drive sprocket 162 and associated driven components up to a desired speed, e.g., synchronized, at any desired speed versus time (dV/dt) slope. Furthermore, engagement of the clutch assembly 100 and thus torque throughput may be modulated by a traction or slip control system, which forms no portion of this invention, to improve vehicle performance in poor tractive conditions. Of course, direct high speed drive to the chain drive sprocket 162 and associated components of the secondary drive line may be achieved by fully activating and locking the clutch assembly 100. Alternatively, the chain drive sprocket 162 and associated components of the secondary drive line may be driven directly and positively from the carrier 212 of the planetary gear speed reduction assembly 210 at reduced speed (low gear) by virtue of engagement of the secondary dog clutch 184 with the gear teeth or splines 206 on the secondary drive collar 208.

The primary dog clutch 238 and its internal gear teeth or splines 242 and external gear teeth or splines 246 are configured such that they are translatable between driving engagement with the gear teeth or splines 236 on the periphery of the primary drive collar 232, which provides direct drive from the input shaft 52 to the output shaft 66, or engagement with the gear teeth or splines 248 on the carrier 212 of the planetary gear speed reduction assembly 210, which provides a reduced speed (low gear) range drive between the input shaft 52 and the output shaft 66.

The selection of high and low speed ranges and modulating or direct torque transfer from the input shaft to the primary or first output shaft 66 and the secondary or second output shaft 78 is achieved by providing appropriate commands to the shift control operator 262 and providing appropriate electric current to the electromagnetic coil 144 to modulate or fully activate the clutch assembly 100.

Translation and engagement of the dog clutches 184 and 238 are readily and conveniently achieved not only by virtue of the arrangement of components along the input shaft 52 and the output shaft 66 but also by virtue of the common coupling of the clutches to the shift control rod 196.

In the leftmost position of the control rod 196, the position illustrated in FIG. 3, the secondary dog clutch 184 is disengaged from the secondary drive collar 208. When the secondary dog clutch 184 is in this position, the disc pack type clutch assembly 100 may be activated or modulated as desired to bring the chain drive sprocket 162 and associated components of the secondary drive line up to the speed of the input shaft 52 within a desired time period. Furthermore, the clutch assembly 100 may be modulated, as noted above, to deliver torque to the chain drive sprocket 162 and associated components of the secondary drive line on a short term or long term basis to, for example, control wheel spin and improve traction. Also in the leftmost position of the shift control rod 196, the primary dog clutch 238 engages the primary drive collar 232, thereby providing direct drive from the input shaft 52 to the output shaft 66.

The shift control rod 196 may be moved to a middle position wherein the primary dog clutch 238 is disengaged from both the primary drive collar 232 and the carrier 212 of the planetary gear speed reduction assembly 210. (The secondary dog clutch 184 remains disengaged from the secondary drive collar 234 in this position and, if the clutch assembly 100 is not activated, the chain drive sprocket 162 is in neutral and free wheels.) Assuming the clutch assembly 100 is not activated, the middle position of the shift control rod 196 represents a neutral position wherein neither the first (primary) output shaft 66 nor the secondary output shaft 78 are coupled to the input shaft 52.

With reference to FIG. 2, the shift control rod 196 may be also moved to the right by an appropriate command to the shift control operator 262. In this position, the primary dog clutch 238, which is directly coupled through the primary shift fork assembly 256 to the shift control rod 196, couples the carrier 212 of the planetary gear speed reduction assembly 210 to the output shaft 66 thereby providing reduced speed (low gear) range drive to the primary output shaft 66 and, by virtue of engagement of the secondary dog clutch 184 with the secondary drive collar 208, reduced speed (low gear) range drive is likewise provided to the chain drive sprocket 162 and associated components.

Because the secondary shift fork assembly 192 is resiliently coupled to the shift control rod 196 through the compression spring 198, it will be appreciated that, with regard to the shift from high or neutral to the low speed range output, engagement of the gear teeth or splines 246 on the primary dog clutch 238 with the gear teeth or splines 248 on the planetary gear carrier 212 will ultimately control the lateral translation of the shift control rod 196. The resilient interconnection of the secondary shift fork assembly 192 with the shift control rod 196 will allow full travel of the shift control rod 196 and engagement of the secondary dog clutch 184 with the gear teeth or splines 206 of the secondary drive collar 208 as soon as the teeth properly align.

The various elements of the transfer case assembly 50 according to the present invention cooperate to provide both high and low range outputs as well as neutral to the primary output shaft 66 which, as illustrated, drives the rear tire and wheel assemblies 32 and the secondary output shaft 78 which, as illustrated, drives the front. tire and wheel assemblies 42 through locking hubs 44. It should be appreciated that the cooperating mechanical components of the transfer case assembly 50 according to the present invention may be utilized in a vehicle wherein the primary drive wheels, i.e., those wheels driven by the primary output shaft 66, may be located at the front of a vehicle and that the secondary drive wheels, i.e., those wheels driven by the secondary output shaft 78, may be located at the rear of the vehicle.

The transfer case assembly 50 according to the present invention provides on-the-fly upshifts from low gear to high gear. High to low downshifts are preferably undertaken while the vehicle is stopped.

The disc pack type clutch assembly 100, as noted previously, may be utilized to achieve several desirable functions. First of all, it may be activated, by the application of a low level current, to transfer only a fraction of the torque available on the input shaft 52 to the chain drive sprocket 162 and associated components to bring the front (secondary) drive line up to a speed lower than or equal to the speed of the input shaft 52. The speed of the secondary drive line may thus be synchronized to any desired speed. Secondly, the disc pack clutch assembly 100 may be activated, typically at higher current levels, to transfer some or significant levels of torque from the input shaft 52 to the chain drive sprocket 162 and associated components of the front (secondary) drive line.

As also noted previously, the instantaneous level of activation of the disc pack type clutch assembly 100 and torque transfer may be controlled by a computer having wheel speed sensor inputs to provide skid and/or traction control, for example. Lastly, the disc pack type clutch assembly 100 provides synchronization and facilitates smooth on-the-fly shifting from the low speed range output of the planetary gear assembly 210 to the high speed range output. This is achieved by ramping up current to the coil 144 of the disc pack type clutch assembly 100 and temporarily providing primary drive through the secondary, i.e., front tire and wheel assemblies 42 in the example illustrated, while the primary dog clutch 238 is moving from the low range position through neutral to the high range, i.e., direct drive position.

The foregoing disclosure is the best mode devised by the inventors for practicing this invention. It is apparent, however, that an apparatus incorporating modifications and variations will be obvious to one skilled in the art of vehicle drive trains. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A vehicle drive assembly for delivering torque to a primary drive line and secondary drive line comprising, in combination, a transfer case having an input member, a primary output member for delivering torque to such primary drive line, a secondary output member for delivering torque to such secondary drive line, a planetary gear assembly having an input driven by said input member, an output, and speed reducing gearing operably disposed between said input and said output, primary clutch means for driving said primary output member and selectively engageable with said input member or said output of said planetary gear assembly, secondary clutch means for driving said secondary output member and selectively engageable with said input member or said output member of said planetary gear assembly, locking hubs disposed in such secondary driveline, means for actuating said primary and secondary clutch means, control means operably connected to said means for actuating for directly selecting one of three drive modes, said three drive modes including two wheel drive; four wheel drive, high gear and four wheel drive, low gear and including means for activating said locking hubs.

2. The vehicle drive assembly of claim 1 wherein said control means includes a three position switch with one of each of said three positions corresponding to one of each of said three drive modes.

3. The vehicle drive assembly of claim 1 wherein said control means includes three push-button switches, one each of said three push-button switches corresponding to one each of said three drive modes.

4. The vehicle drive assembly of claim 1 further including a shift operator linked to both said primary clutch means and said secondary clutch means.

5. The vehicle drive assembly of claim 1 further including shift operator means linked to both said primary clutch means and said secondary clutch means for engaging said primary and said secondary clutch means with said output of said planetary gear assembly.

6. The vehicle drive assembly of claim 5 wherein said shift operator means defines at least two positions: a first position connecting said primary and said secondary clutch means with said output of said planetary gear assembly and a second position connecting said primary clutch means with said primary output member.

7. The vehicle drive assembly of claim 1 wherein said secondary clutch means includes a modulating clutch means for selectively transferring torque between said input member and said secondary output member.

8. The vehicle drive assembly of claim 7 wherein said modulating clutch means includes a pair of opposed members defining opposed ramp surfaces and means disposed between said ramp surfaces for effecting translation of one of said pair of members away from the other of said pair of members upon relative rotation of said members and a disc pack clutch assembly operably disposed adjacent said pair of opposed members.

9. A transfer case for delivering torque to a primary drive line and a secondary drive line comprising, in combination, an input shaft, a primary output adapted to drive such primary drive line, a secondary output adapted to drive such secondary drive line, a modulating clutch assembly operably disposed between said primary output and said secondary output, said modulating clutch including a disc pack and an operator for adjusting the frictional coupling through said disc pack in response to a signal, a planetary gear assembly having a sun gear driven by said input shaft and a planet carrier having at least one planet gear engaging said sun gear, primary clutch means for selectively connecting said input shaft or said planet carrier to said primary output, secondary clutch means for selectively connecting said planet carrier to said secondary output, and actuator means for moving said primary and said secondary clutch means between at least a first position wherein said primary output is connected to said input shaft and a second position wherein said primary and said secondary outputs are connected to said planet carrier.

10. The transfer case of claim 9 wherein said secondary output includes a chain drive sprocket.

11. The transfer case of claim 9 wherein said secondary output is a shaft having a driven chain sprocket coupled thereto, a drive chain in engagement with said driven chain sprocket and a drive chain sprocket disposed adjacent said modulating clutch means and said secondary clutch means.

12. The transfer case of claim 9 wherein said actuator means includes a shift member moveable between a first position for directly connecting said input shaft to said primary output for establishing a high-range drive and a second position for connecting said plantet carrier to said primary output for establishing a low range drive.

13. The transfer case of claim 12 wherein said shift member of said actuator means also directly connects said planet carrier to said secondary output for establishing a low range drive.

14. The transfer case of claim 13 wherein a portion of said shift member includes a spring for providing a resilient coupling between said actuator and said shift member.

15. The transfer case of claim 9 wherein said primary and secondary clutch means includes splined clutch collars disposed about said input shaft.

16. A transfer case for providing torque to a primary drive line and a secondary drive line of a vehicle comprising, in combination, an input shaft, a primary output adapted to drive such primary drive line, a secondary output adapted to drive such secondary drive line, a modulating clutch for adjustably engaging said input shaft and said secondary output said modulating clutch having an operator for adjusting the frictional coupling through said modulating clutch and an input line communicating with said operator for carrying a clutch engagement signal, a planetary gear assembly having a sun gear driven by said input shaft and a planet carrier having at least one planet gear engaging said sun gear, a primary positive clutch for engaging said input shaft or said planet carrier with said primary output, a secondary positive clutch for engaging said planet carrier with said secondary output, and an actuator for positioning said primary and said secondary clutch means in at least a first position wherein said primary output is driven by said input shaft and a second position wherein said primary and said secondary outputs are connected to said planet carrier whereby a modulatable connection between said input shaft and said secondary output is achieved by said modulating clutch means and a direct connection between said input shaft and said secondary output is achieved by said secondary positive clutch means.

17. The transfer case of claim 16 wherein said actuator means includes a single operator and a shift member associated with each of said primary and said secondary clutch means.

18. The transfer case of claim 16 wherein said actuator means includes a shift member moveable between a first position for directly connecting said input shaft to said primary output for establishing a high-range drive and a second position for connecting said planet carrier to said primary output for establishing a low range drive.

19. The transfer case of claim 16 wherein said modulating clutch operator includes a pair of opposed members defining opposed ramp surfaces and means disposed between said ramp surfaces for effecting translation of one of said pair of members away from the other of said pair of members upon relative rotation of said members and a disc pack clutch assembly operably disposed adjacent said pair of opposed members.

20. The transfer case of claim 16 wherein said modulating clutch operator includes a force amplification assembly having a pair of opposed circular members having opposed cam surfaces, an electric coil for providing drag to one of said pair of opposed circular members having opposed cam surfaces and an adjacent disc pack assembly compressed by said other of said pair of opposed circular members.

* * * * *